Patented Oct. 20, 1953

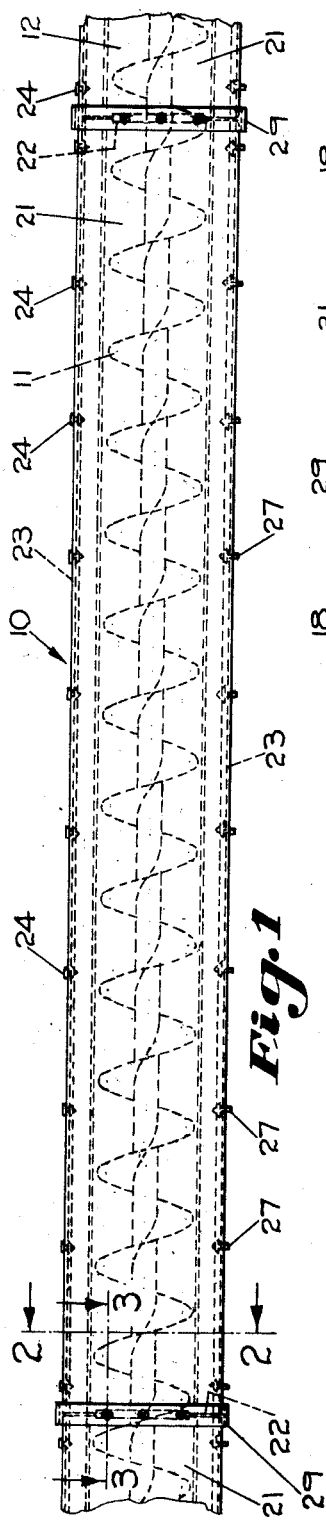

2,656,036

UNITED STATES PATENT OFFICE 2,656,036

CONVEYER HOUSING

Paul V. Whitney, Columbus, Ohio, assignor to The Jeffrey Manufacturing Company, a corporation of Ohio Application September 2, 1950, Serial No. 182,896

4 Claims. (Cl. 198—213)

This invention relates to conveyer housings and more particularly to closed conveyer housings that include a side or portion that may be removed therefrom.

One object of the invention is to provide an improved conveyer housing having a removable side or portion which may be attached in a substantially dust-proof manner, if desired, to the body or trough portion of the housing by an improved arrangement of fastening elements.

Another object of the invention is to provide a simple, improved conveyer housing, as set forth in the foregoing object, in which the devices for fastening the conveyer cover and conveyer trough together are attached so as not to become inadvertently separated from them when the cover is removed from the housing.

Another object of the invention is to provide an improved conveyer housing having a removable side porton or cover which is attached to the body or trough portion of the housing by cam means at which side of the cover that clamp the cover to the housing.

Another object of the invention is to provide an improved conveyer housing having a removable side portion or cover that includes a plurality of sections each of which is attached to the body or trough portion of the housing by cam means at each side of each section and which sections are interconnected by improved closure means.

Other objects of the invention will appear hereinafter, the novel features and combinations being set forth in the appended claims.

In the accompanying drawings:

Fig. 1 is a view in plan of a screw conveyer including a conveyer housing embodying the invention;

Fig. 2 is a view in section on a larger scale, the view being taken on line 2—2 of Fig. 1;

Fig. 3 is a view in section on a larger scale of a fragment of a conveyer housing seen in Figs. 1 and 2, the view being taken on line 3—3 of Fig. 1;

Fig. 4 is a view in plan showing fragments of adjacent conveyer housing cover plates and a bar or strip that interconnects them, a portion of said bar or strip being broken away to show more clearly the construction of the adjacent ends of said cover plates and Fig. 5 is a view on a larger scale of a fragment of the conveyer housing as seen in Fig. 2 and showing particularly the structure of an adjustable cam mechanism carried by the conveyer housing cover.

In Fig. 1 of the drawings there is shown a portion 10 of a housing for a spiral, worm or screw conveyer element 11. The portion 10 of the housing is connected at one end to the usual feed section and at the other end it is connected to the usual discharge housing section. The feed and discharge housing sections are not shown since they are well understood in the art and, per se, form no part of the present invention.

The portion 10 of the housing is formed of a plurality of open topped U-shaped conveyer trough sections 12 which are secured together at their ends by U-shaped angle members 13 (see Figs. 2 and 3) that are preferably welded to the outside of the U-shaped conveyer trough sections 12 at their ends. Each of the U-shaped angle members 13 provides an outstanding flange 14 at one end of one of the trough sections 12 and each of the flanges 14 provided thereby abuts a corresponding flange on an adjacent trough section 12.

Between the adjacent U-shaped angle members 13 there is preferably provided a gasket 15 of felt, rubber or the like, which is clamped between the flanges 14 of adjacent members 13 by a plurality of bolts and nuts 16. Each open topped U-shaped conveyer trough section 12 includes adjacent its open top or side and along each edge thereof an outstanding or laterally extending flange 17, and each of these flanges 17 provides an upwardly facing abutment or surface 18 that receives a strip of gasket material 19 which may be formed of felt, rubber, or the like. The underside of the flanges 17 provide, along their outer edges, downwardly facing abutments or cam means 20 that extends substantially the full length of each of the conveyer trough sections 12 and along each side thereof.

The top or open side of the conveyer trough or housing portion 10 is closed by a plurality of cover plates 21 which preferably are notched at their ends, as seen in Fig. 4 of the drawings, to provide a space or opening 22 between them. The longitudinally extending side edges of each of the cover plates 21 are bent downwardly to form flanges 23, as seen in Fig. 2 of the drawings, that extend downwardly, transversely and at one side of the longitudinally extending downwardly facing abutments or cam means 20 of the trough sections 12.

The flanges 17 and 23 are integral with the trough section 12 and the cover plate 21, respectively, as seen in the drawings, but it is to be understood that they may be formed of separate pieces, such as angle members riveted or otherwise attached to the trough sections 12 and cover plates 21, if desired. Each cover plate 21 spans and closes the open top or side of one of the conveyer trough sections 12 and it seats upon the gasket 19 at each side thereof to seal substantially the cover and the trough sections together.

As seen in Fig. 2 of the drawings, the right-hand downwardly extending flange 23 of the cover plate 21 has secured thereto a plurality of rivets 24 having cone shaped heads 25 that form upwardly facing abutments or cams that cooperate with the downwardly facing abutments or cams 20 on the adjacent flange 17 of the conveyor trough section 12. The opposite or left-hand downwardly extending flange 23 of the cover plate 21 has welded thereto a plurality of nuts 26 each of which receives a screw 27, the head of which is cone shaped like the heads 25 of rivets 24. The heads of screws 27 form upwardly facing abutments or cams that cooperate with the downwardly facing cam or abutment 20 of the flange 17 adjacent thereto. Each screw 27 is preferably slotted in its end to receive a screwdriver by which the screw and its integral head or cam may be adjusted to and from the adjacent flange 17 of the trough section 12.

From the description thus far given it will be seen that each of the conveyer cover sections 21 includes along each side thereof a flange that extends transversely of the adjacent longitudinally extending side flange 17 of the conveyer trough section 12 and that each of the downwardly extending flanges 23 carry cam means that cooperate with an adjacent flange 23 of the conveyer trough section 12. When the screws 27 are adjusted inwardly or toward the conveyer trough section 12 the upwardly facing cam surfaces provided by the cone shaped heads or upwardly facing cam surfaces 25 of the rivets 24 and screws 27 cooperate with the downwardly facing abutments 20 to cam the cover plate 21 to the left and clamp it downwardly upon the gaskets 19 to the flanges 17 to seal substantially the cover plate 21 to the conveyer trough section 12. The cover plates 21 may be removed readily from the conveyer trough sections 12 by the mere expedient of loosening the screws 27 and lifting the cover plates 21 from the trough sections 12.

The cover plates or sections 21 are preferably slightly spaced from each other at their adjacent ends although they may abut each other, and through the space or opening 22 there is extended T-headed bolts 28 that secure a bar or strip 29 that interconnects the adjacent cover plates 21 and rests upon a strip 30 of gasket material of felt, rubber or the like. Each bar or strip 29 has substantially the same contour, as seen in Fig. 2, as the cover plates 21 and it is of such size as to fit over the adjacent cover plates 21 and gasket or seal strip 30 and each is flanged at its ends to overlap the adjacent downwardly extending flanges 23 of the cover plates 21.

Each of the bars or strips 29 is provided with three of the T-headed bolts 28 which extend therethrough and are provided with gaskets 31, washers 32 and nuts 33.

In order to place each bar or strip 29 and gasket 30 upon the housing portion 10 to close substantially one of the spaces or openings 22 and to seal the adjacent cover plates 21 together it is only necessary that the heads of the T-headed bolts 28 be aligned so that they extend transversely of the conveyer trough 10 and longitudinally of one of the spaces or openings 22 whereby their heads may pass through the latter between adjacent cover plates 21. With the bolts 28 thus aligned, the bar or strip 29 and gasket 30 are placed over the space or opening 22, and the heads of the T-headed bolts 28 are passed through the space or opening 22.

With the bar or strip 29 and gasket 30 thus positioned the T-headed bolts 28 are rotated 90° so that their heads extend longitudinally of the conveyer trough 10 and transversely of the space or opening 22 and overlap the edges of the adjacent cover plates 21. The nuts 33 are now tightened and the bar or strip 29 is secured in position. In order to remove the bar or strip 29 and gasket 30 from the conveyer housing 10 the nuts 33 are loosened, the bolts 28 are rotated so that their heads are aligned with the space or opening 22, and the bar or strip 29 and gasket 30 are lifted therefrom.

From the foregoing description it will be seen that this invention provides a very simple and inexpensive conveyer trough construction that includes a plurality of covers or cover sections that may be readily placed thereon and removed therefrom by the simple removal of the bars or strips 29 and by the loosening of the cam means or screws 27.

It will also be seen that the T-headed bolts 28, nuts 33, washers 32 and gaskets 31 and 30 need never be removed from the bars or strips 29 and therefore will not inadvertently become lost therefrom when the bars or strips are removed from the covers. It will also be seen that the cam screws 27 are backed outwardly and against the nuts 26 when the conveyer cover plates 21 are to be removed from the conveyer trough 10 and that therefore these screws 27 need not be separated from the cover plates 21. Gaskets 19 may be attached to either the cover plates 21 or the flanges 17, and preferably to the cover plates 21, as by cement so that when the cover plates 21 are removed from the conveyer trough section 12 the gaskets 19 will remain attached to them.

As shown in Fig. 1 of the drawings there is a rivet 24 spaced opposite each of the cam screws 27 and while this arrangement is preferred it is to be understood that other arrangements may be utilized, and that any desired number of the rivets 24 or cams 25 and screws 27 may be provided.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A substantially sealed housing structure for a screw conveyer including a generally open topped U-shaped conveyer trough having an integral laterally outwardly extending flange means at each side thereof providing spaced upwardly facing gasket seats and downwardly facing abutments, sectional cover means for closing the top of said trough including a plurality of adjacent cover plates each having integral flange means at each side thereof extending downwardly below said trough flanges, upwardly facing cam means carried by each of said cover flange means adapted to cooperate with said abutments for clamping said cover plate to said trough, screw means for adjusting the cam means on at least one of said cover flange means for clamping said cover to said trough, gasket means between said cover and gasket seats against which said cover is clamped, means sealing the adjacent ends of said cover plates together, each means including a bar interconnecting said adjacent cover plates, T bolts extending through each of said bars and between said adjacent cover plates, the heads of said bolts being of such dimensions that when aligned with the ends of said cover plates they may be removed therefrom and when positioned to extend transversely thereof they engage said adjacent cover plates, nuts and washers on said T bolts, and gasket means between said bars and cover plates and cover plates and washers.

2. A substantially sealed housing structure for a screw conveyer including a generally open topped U-shaped conveyer trough having an integral laterally outwardly extending flange means at each side thereof providing spaced upwardly facing gasket seats and downwardly facing abutments, sectional cover means for closing the top of said trough including a plurality of cover plates each having integral flange means at each side thereof extending downwardly below said trough flanges, upwardly facing cam means carried by each of said cover flange means adapted to cooperate with said abutments for clamping said cover plate to said trough, screw means for adjusting the cam means on at least one of said cover flange means for clamping said cover to said trough, gasket means between said cover and gasket seats against which said cover is clamped, means sealing the adjacent ends of said cover plates together, each means including a bar spanning the space between said adjacent cover plates, gasket means between said adjacent cover plates and bar, and means clamping said bar against said gasket and cover plates.

3. A substantially sealed housing structure for a screw conveyer including a generally open topped U-shaped conveyer trough having an integral laterally outwardly extending flange means at each side thereof providing spaced upwardly facing gasket seats and downwardly facing abutments, sectional cover means for closing the top of said trough including a plurality of cover plates, each having integral flange means at each side thereof extending downwardly below said trough flanges, upwardly facing cam means carried by each of said cover flange means adapted to cooperate with said abutments for clamping said cover plate to said trough, screw means for adjusting the cam means on at least one of said cover flange means for clamping said cover to said trough, gasket means between the adjacent ends of said cover plates, and means clamping said gasket means between said plates.

4. A housing structure for a conveyer including a conveyer trough having an open side and a laterally outwardly extending flange at each side thereof providing an abutment, sectional cover means for closing said open side including a plurality of plates each having flange means extending transversely of said abutments, cam means carried by said cover flange means adapted to cooperate with said abutments for clamping said cover plate to said trough, and means closing the spaces between the adjacent cover plates, each of said means including a bar spanning the space between adjacent cover plates and means securing said bar upon said cover plates.

PAUL V. WHITNEY.

References Cited in the file of this patent

UNITED STATES PATENTS

| Number | Name | Date |
|---|---|---|
| 263,448 | Withey | Aug. 29, 1882 |
| 2,031,054 | McCarthy | Feb. 18, 1936 |
| 2,038,471 | Benatar | Apr. 21, 1936 |
| 2,459,770 | Escher | Jan. 18, 1949 |
| 2,465,145 | Brainerd | Mar. 22, 1949 |

FOREIGN PATENTS

| Number | Country | Date |
|---|---|---|
| 207,364 | Great Britain | Nov. 29, 1923 |
| 333,950 | Italy | Jan. 17, 1936 |